(12) United States Patent
Schmieder et al.

(10) Patent No.: US 12,503,989 B2
(45) Date of Patent: Dec. 23, 2025

(54) GAS INJECTOR COMPRISING A VACUUM-CONTROLLED SECOND SEALING SEAT

(71) Applicant: Robert Bosch GmbH, Stuttgart (DE)

(72) Inventors: Dietmar Schmieder, Markgroeningen (DE); Hubert Stier, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/710,172

(22) PCT Filed: Sep. 26, 2022

(86) PCT No.: PCT/EP2022/076657
§ 371 (c)(1),
(2) Date: May 31, 2024

(87) PCT Pub. No.: WO2023/088596
PCT Pub. Date: May 25, 2023

(65) Prior Publication Data
US 2025/0035073 A1    Jan. 30, 2025

(30) Foreign Application Priority Data
Nov. 19, 2021  (DE) ............... 10 2021 213 023.2

(51) Int. Cl.
*F02M 21/02*    (2006.01)
(52) U.S. Cl.
CPC .... *F02M 21/0263* (2013.01); *F02M 21/0254* (2013.01)

(58) Field of Classification Search
CPC .......... H02J 50/001; H02J 50/80; H02J 50/20; H04W 8/22; H04W 52/367; H04W 8/24
See application file for complete search history.

(56) References Cited

FOREIGN PATENT DOCUMENTS

| DE | 3119211 A1 | 12/1982 |
|---|---|---|
| DE | 102014224340 A1 * | 6/2016 |
| DE | 112014005309 T5 | 8/2016 |

(Continued)

OTHER PUBLICATIONS

International Search Report for PCT/EP2022/076657 dated Jan. 18, 2023.

*Primary Examiner* — Lindsay M Low
*Assistant Examiner* — Charles J Brauch
(74) *Attorney, Agent, or Firm* — NORTON ROSE FULBRIGHT US LLP (57) ABSTRACT

A gas injector for injecting a gaseous medium. The gas injector includes: a closing element which opens and closes a passage opening at a first sealing seat; an actuator for actuating the closing element; a restoring element for restoring the closing element; a second sealing seat which is located between a gas supply line connection and the first sealing seat in the flow direction of the gaseous medium and opens and closes a gas flow path in the gas injector; a vacuum connection which is located upstream of the second sealing seat in the flow direction of the gas injector; and a control valve which is fluidically connected to the vacuum connection and is designed to connect the vacuum connection to a vacuum source in order to open the second sealing seat.

11 Claims, 7 Drawing Sheets

(56) References Cited

FOREIGN PATENT DOCUMENTS

| | | |
|---|---|---|
| DE | 102016211831 A1 | 1/2018 |
| EP | 0863300 A1 | 9/1998 |
| IT | 0863300 A1 * | 9/1998 |
| JP | H07034981 A | 2/1995 |
| JP | H1018915 A | 1/1998 |

* cited by examiner

GAS INJECTOR COMPRISING A VACUUM-CONTROLLED SECOND SEALING SEAT

FIELD

The present invention relates to a gas injector for injecting a gaseous medium, in particular hydrogen or natural gas, comprising a second sealing seat that can be opened under vacuum control.

BACKGROUND INFORMATION

Gas injectors in different designs are described in the related art. Compared to fuel injectors for liquid fuels, the technical requirements for gas injectors are significantly different. One problem area with gas injectors is sealing the gas injector over prolonged periods of time. For example, the scenario should be prevented in which, in the switched-off state of an internal combustion engine, despite the sealing seat being closed, gaseous fuel diffuses from the gas injector into the combustion chamber beyond the actually closed sealing seat and possibly enters the surrounding area. This should be avoided at all costs.

SUMMARY

A gas injector according to the present invention for injecting a gaseous medium may have the advantage that, in the case of a gas injector that is closed even over prolonged periods of time, it is possible to significantly reduce a possible loss of the gaseous medium from the gas injector. Furthermore, in order to open a second sealing seat, which is formed in particular as an elastomer sealing seat, reliable opening can also be achieved, in addition to improved sealing, even with large sealing diameters of the second sealing seat. The gas injector according to the present invention is very simple and cost-effective. This may be achieved according to an example embodiment of the present invention in that the gas injector comprises a closing element that opens and closes a passage opening at a sealing seat. Furthermore, an actuator is provided for actuating the closing element. The gas injector further comprises a restoring element for restoring the closing element. The second sealing seat, which is located between a gas supply line connection and the first sealing seat in the flow direction of the gaseous medium through the gas injector, opens and closes a gas flow path through the gas injector. The gas injector comprises a vacuum connection, which is located upstream of the second sealing seat in the flow direction of the medium through the gas injector. Furthermore, the gas injector according to the present invention comprises a control valve that is located on the vacuum connection and is designed to connect the vacuum connection to a vacuum source in order to open the second sealing seat. The control valve is preferably a 2/2-way valve. By providing two sealing seats, gas tightness of the gas injector can be ensured even during prolonged periods of downtime and non-actuation of the gas injector. Even assuming that the first sealing seat, which is directed towards the combustion chamber, would become leaky, at least any amount of the gaseous medium flowing out of the gas injector is reduced to the volume between the first and the second sealing seat due to the second sealing seat. Furthermore, a very simple and cost-effective structure of the gas injector can be achieved by using pneumatic actuation by means of a vacuum to open the second sealing seat. As a result, heat problems at the gas injector, which can occur with electrically actuated shut-off elements, can also be prevented.

Preferred example embodiments and developments of the present invention are disclosed herein.

According to an example embodiment of the present invention, preferably, the second sealing seat is formed between an axially movable piston element and a housing component. The piston element enables the simple and secure opening of the second sealing seat by means of a vacuum.

According to an example embodiment of the present invention, preferably, the gas injector further comprises a third sealing seat, which is located on the piston element. The third sealing seat opens and closes a connection between the gas flow path in the gas injector and the control valve. The piston element can be moved back and forth between the second and third sealing seats. Thus, the second and third sealing seats are not closed at the same time.

According to an example embodiment of the present invention, particularly preferably, the third sealing seat is formed between a radially outwardly directed flange on the piston element and a stop side on a housing component. The housing component preferably also serves as a guide component for the piston element.

The piston element is preferably a hollow piston that has a piston end face, wherein the second sealing seat seals against the piston end face. The second sealing seat is preferably formed on a radially inwardly directed projection of the housing, so that the second sealing seat can be opened and closed by axial movement of the piston element. For this purpose, the hollow piston preferably has one or more apertures on a piston jacket.

According to an example embodiment of the present invention, further preferably, the gas injector comprises a control chamber that is formed on an outer circumference of the piston element and is located in the connecting path between the gas flow path and the control valve. Preferably, a throttle is present between the control chamber and the gas flow path. The throttle prevents gaseous medium from flowing out from the gas flow path into the vacuum region of the gas injector created by the open control valve. The throttle is preferably a throttle gap on the outer circumference of the piston element to a housing component or alternatively the throttle is formed in the housing component, in particular the stop disk.

According to an example embodiment of the present invention, further preferably, the gas injector comprises a reservoir that is connected downstream of the control valve. Thus, the reservoir is located between the control valve and the vacuum source. A throttle is further preferably provided between the reservoir and the vacuum source. As a result, it is ensured that, when the internal combustion engine is started, gaseous medium that is located in the control volume for opening the second sealing seat is not fed at once into an intake tract, which can be a vacuum source in the internal combustion engine, and an ignitable mixture is not formed therein. Via the reservoir and in particular the throttle, a slow release of the gaseous medium into the intake tract can be enabled.

According to an example embodiment of the present invention, further preferably, an elastomer sealing element comprising a retaining plate is located on the second sealing seat. The retaining plate enables the use of simply constructed sealing elements, for example standardized O-rings, and can also enable the sealing element to be sealed by means of a larger sealing surface between the sealing element and the retaining plate. Furthermore, the retaining plate can provide sufficient swelling space for elastic deformation of the sealing element.

According to an example embodiment of the present invention, further preferably, the actuator is located in an enclosed space. The enclosed space for the actuator is preferably sealed by means of a metal membrane. As a result, the actuator does not come into contact with the gaseous medium and corrosion problems on the components of the actuator can be avoided.

Furthermore, the present invention relates to an internal combustion engine comprising a gas injector according to the present invention. According to an example embodiment of the present invention, the internal combustion engine preferably comprises an intake pipe of the internal combustion engine as a vacuum source, which intake pipe is fluidically connected to the gas injector via the control valve. An outlet of a connecting line between the intake pipe and the gas injector is preferably located downstream of a throttle valve in the intake pipe.

According to an example embodiment of the present invention, further preferably, the internal combustion engine comprises a plurality of gas injectors, wherein all gas injectors are connected only to a single, common control valve. As a result, the investment costs for the injection device according to the present invention can be significantly reduced.

According to an example embodiment of the present invention, further preferably, the internal combustion engine comprises a catalytic converter, wherein a control quantity of the gaseous medium, which flows out by opening the control valve, is guided to the catalytic converter. Preferably, a reservoir for temporarily storing the gaseous medium is located in the connecting path between the control valve and the catalytic converter, in order to ensure that the gas injector is sufficiently temperature-controlled after a cold start and can convert the components of the control quantity of the gaseous medium into gas components that are harmless to the environment.

BRIEF DESCRIPTION OF THE DRAWINGS

Exemplary embodiments of the present invention are described in detail below with reference to the figures.

DETAILED DESCRIPTION OF EXAMPLE EMBODIMENTS

A gas injector 1 according to a first preferred exemplary embodiment of the present invention is described in detail below with reference to FIGS. 1 to 3.

Figure 1:
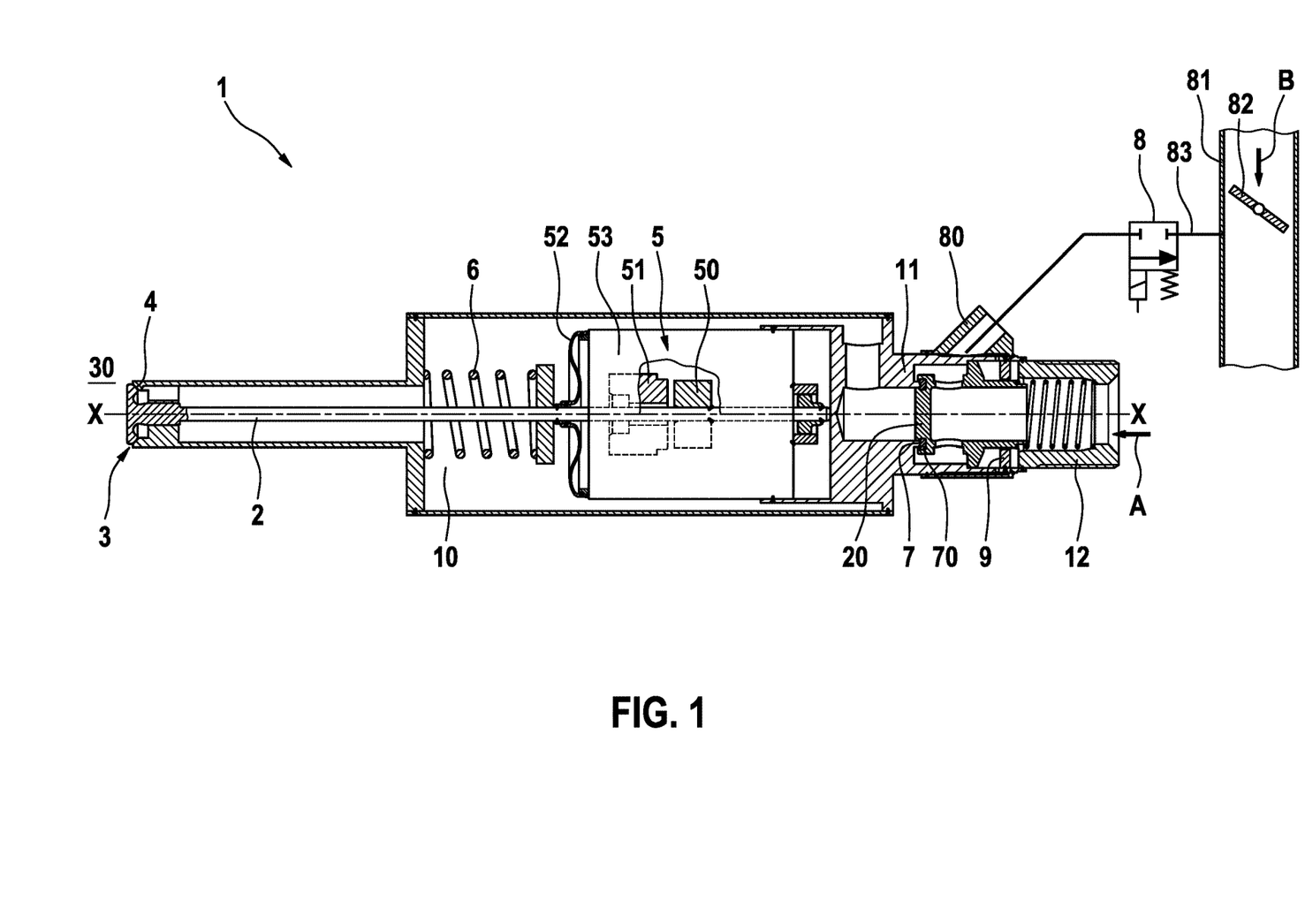
FIG. 1 is a schematic sectional view of a gas injector according to a first exemplary embodiment of the present invention in the closed state.

As can be seen from FIG. 1, the gas injector for injecting a gaseous medium, in particular for injecting hydrogen, comprises a closing element 2 in the form of a valve needle and an actuator 5. The actuator 5 is designed to actuate the closing element in order to bring it into an open position.

The actuator 5 is formed as a magnetic actuator comprising an armature 50 and an inner pole 51. The actuator 5 is located in an enclosed actuator chamber 53, which is sealed against the gaseous medium by means of a flexible metal membrane 52.

The closing element 2 opens and closes a passage opening 3 at a first sealing seat 4. FIG. 1 shows the closed state of the gas injector 1. In the open state, gaseous medium is injected into a combustion chamber 30.

A restoring element 6 restores the closing element to the closed initial position shown in FIG. 1.

Figure 2:
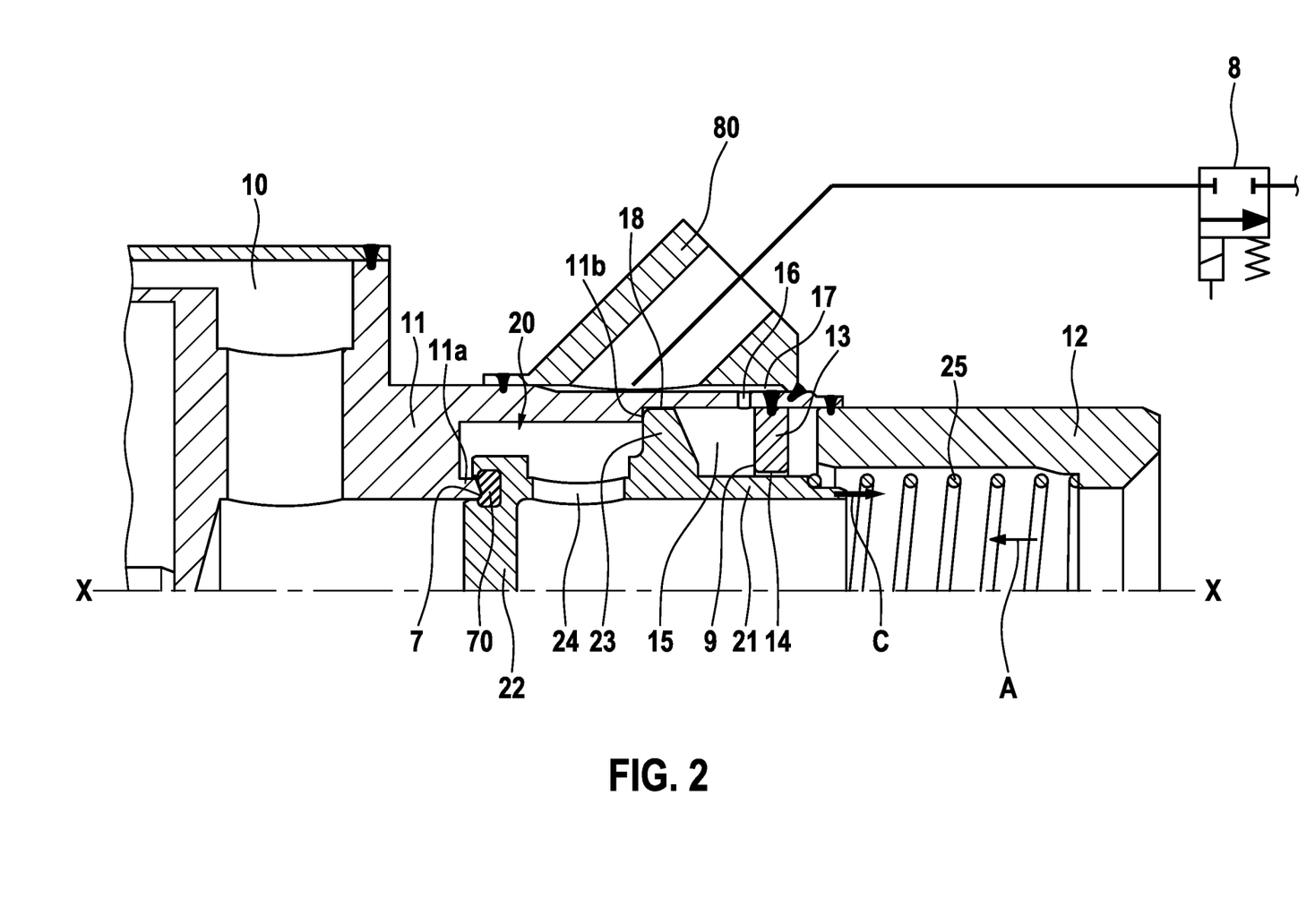
FIG. 2 is an enlarged representation of a second sealing seat of the gas injector of FIG. 1 in the closed state.
Figure 3:
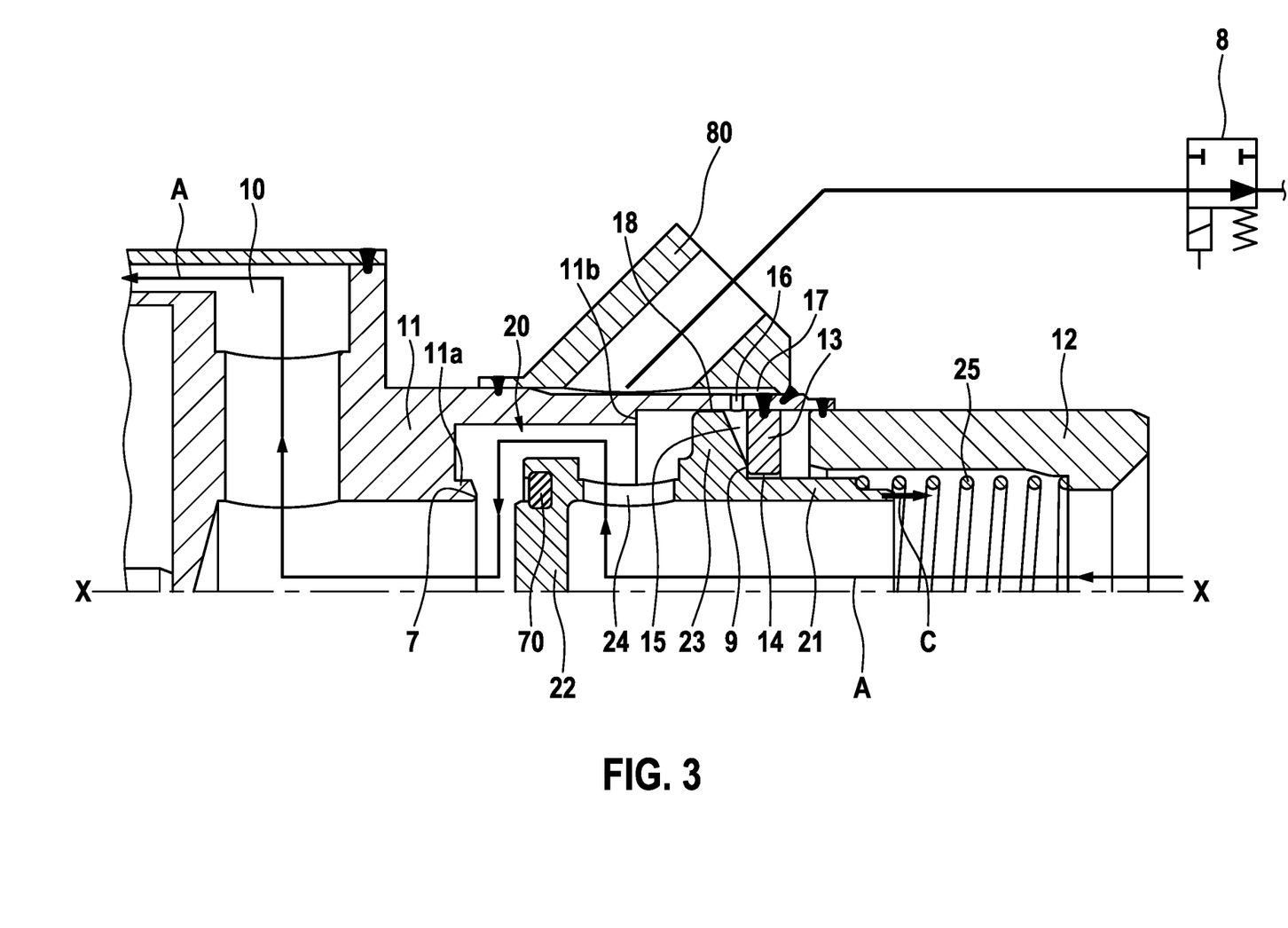
FIG. 3 is a schematic representation of the second sealing seat of the gas injector of FIG. 1 in the open state.

The gas injector 1 further comprises a second sealing seat 7, which can be seen in detail in FIGS. 2 and 3. In the closed state of the gas injector and when the internal combustion engine is switched off, both the first sealing seat 4 and the second sealing seat 7 are closed. The second sealing seat 7 is located further away from the combustion chamber 30, wherein the actuator 5 is located between the first sealing seat 4 and the second sealing seat 7. Therefore, it is possible that the second sealing seat 7 comprises an elastomeric sealing element 70. In the closed state, the elastomeric sealing element 70 can provide very good sealing, so that even if the gas injector is at a standstill for a prolonged period of time, no gas can diffuse via the second sealing seat 7 into a gas chamber 10, which is located upstream of the first sealing seat 4.

The elastomeric sealing element 70 is located in a groove in the piston end face 22 and has a substantially rectangular cross-section with rounded corners.

The elastomeric sealing element 70 seals against a housing component 11 of the gas injector. The housing component 11 has a circumferential projection 11a, on which the second sealing seat 7 is formed.

The use of two sealing seats thus ensures that, in an unused state of the gas injector 1, no gaseous medium can flow from an inlet region 12 via the second sealing seat 7 into the gas chamber 10.

If the first sealing seat 4 is leaky, for example due to thermal influences, the gas injector 1 loses a maximum of the gas volume located in the gas chamber 10 between the first sealing seat 4 and the second sealing seat 7.

The gas injector 1 further comprises a vacuum connection 80, which is located upstream of the second sealing seat in a flow direction (arrows A) of the gas injector and has a control valve 8. The control valve 8 is a 2/2-way valve. The control valve 8 is connected to the vacuum connection 80 and is designed to connect the vacuum connection 80 to a vacuum source in order to open the second sealing seat 7. In this exemplary embodiment, the vacuum source is an intake pipe 81. A connecting line 83 between the control valve 8 and the intake pipe 81 opens into the intake pipe 81 in a region in the flow direction (arrow B) downstream of a throttle valve 82.

The gas injector 1 further comprises a third sealing seat 9 along with a piston element 20. The piston element 20 is formed as a hollow piston and comprises a jacket region 21 along with a piston end face 22. The elastomeric sealing element 70 is located on the piston end face 22 (see FIG. 2). Furthermore, a plurality of apertures 24 are provided in the jacket region 21 in order to enable a gas flow inside the gas injector when the piston element 20 is open (see FIG. 3). Furthermore, a radially outwardly directed flange 23 is formed on the outer circumference of the piston element 20, which flange forms a guide for the piston element 20.

The third sealing seat 9 is formed between the radially outwardly directed flange 23 and a stop disk 13, which is fixed to the housing component 11. A throttle gap 14 is provided between the jacket region 21 of the piston element 20 and the stop disk 13. A control chamber 15 is formed between the flange 23 and the stop disk 13. The control chamber 15 is connected to the vacuum connection 80 via one or more control bores 16 and a radial gap 17.

The piston element 20 is further preloaded by means of a restoring spring 25 into the closed state at the second sealing seat 7 (see FIG. 2).

Thus, the second sealing seat 7 and the third sealing seat 9 are formed in such a way that both sealing seats are not closed at the same time. In the fully open state of the second sealing seat 7, the third sealing seat 9 is closed. This is shown in FIG. 3. The closing of the third sealing seat 9 or the opening of the second sealing seat 7 is provided by means of a vacuum from the vacuum source.

The function of the gas injector 1 according to the present invention is as follows: when the internal combustion engine is started, a vacuum is generated in the intake pipe 81. When the internal combustion engine is started, the control valve 8 is simultaneously energized, so that it is transferred from the closed position shown in FIG. 2 to the open position shown in FIG. 3. As a result, the control chamber 15 is connected to the vacuum source via the control bores 16, the radial gap 17 and the connecting piece 80. As a result, the pressure in the control chamber 15 drops, so that the piston element 20, as indicated in FIG. 2 by the arrow C, is moved against the spring force of the restoring spring 25 in the axial direction towards the inlet region 12. As a result, the second sealing seat 7 is opened.

FIG. 3 shows the fully open state of the second sealing seat 7, so that the gaseous medium, as indicated by the arrow A, can flow through the hollow piston element 20, the apertures 24, past the opened second sealing seat 7 into the gas chamber 10 and can then be injected into the combustion chamber 30 by actuating the actuator 5.

As can be seen from FIG. 3, the volume of the control chamber 15 is significantly reduced by the movement of the piston element 20 in the direction of the arrow C. In the fully open state of the second sealing seat 7, the flange 23 is in contact with the stop disk 13. As a result, the third sealing seat 9 is closed, so that gaseous medium is prevented from being able to flow from the inlet region 12 via the control chamber 15 and the control bores 16 to the vacuum connection 18 and from there via the open control valve 8 into the intake pipe.

In order to be able to move the piston element 20, a throttle gap 18 is provided between the flange 23 and the housing component 11. Although a certain amount of leakage occurs via the throttle gap 18 into the control chamber 15 and from there via the open control valve 8 into the intake pipe, this leakage is minimal due to the length of the throttle gap 18.

During the operation of the internal combustion engine, the control valve 8 is thus continuously kept in the open state, so that the second sealing seat 7 is always open for the injection of gaseous medium. The actual injection is then carried out by opening and closing the first sealing seat 4 by means of the closing element 2.

Since the second sealing seat 7 is opened by means of a vacuum, it is possible that a seat diameter of the second sealing seat 7 can be selected to be very large. This is important because the gaseous medium has a much larger volume compared to liquid fuels, which volume must be injected into the combustion chamber 30 in a short time.

If the internal combustion engine is switched off, the control valve 8 is closed again by interrupting the current supply to the control valve 8, wherein a pressure in the control chamber 15 slowly builds up again via the throttle gap 18. As a result of this and with the support of the restoring element 25, the piston element 20 moves back into the closed position shown in FIG. 2, so that the third sealing seat 9 is opened and the second sealing seat 7 is closed. A stop 11b is provided on the housing component 11, which stop stops a restoring movement of the piston element 20.

Thus, in the switched-off state of the internal combustion engine, the first sealing seat 4 and the second sealing seat 7 are closed, so that there is no risk of a loss of gaseous medium even over a prolonged period of downtime.

Figure 4:
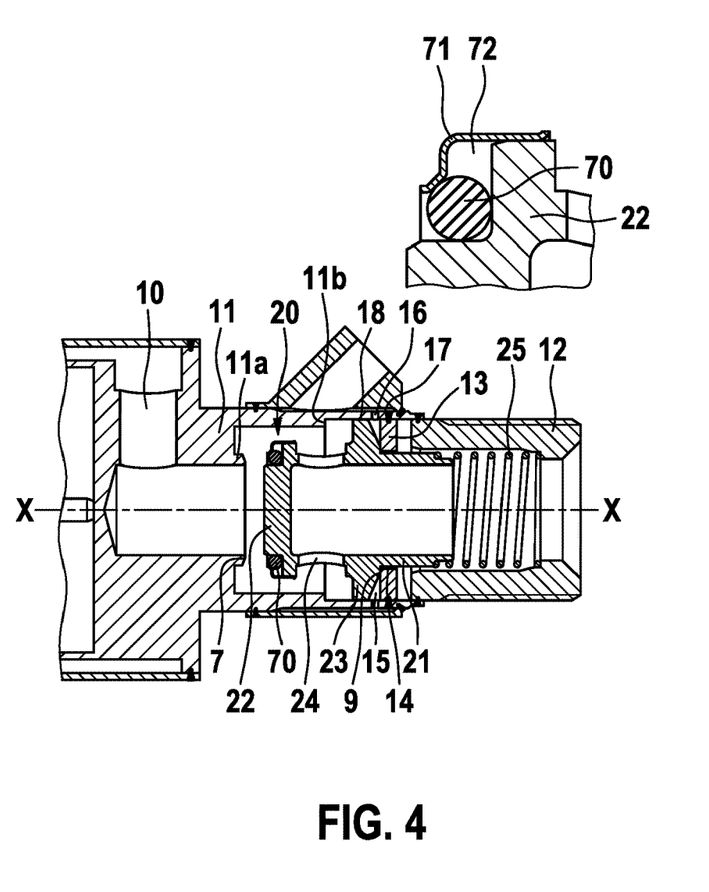
FIG. 4 is a schematic partial sectional view of a gas injector according to a second exemplary embodiment of the present invention in the open state, with an additional detailed representation.
Figure 5:
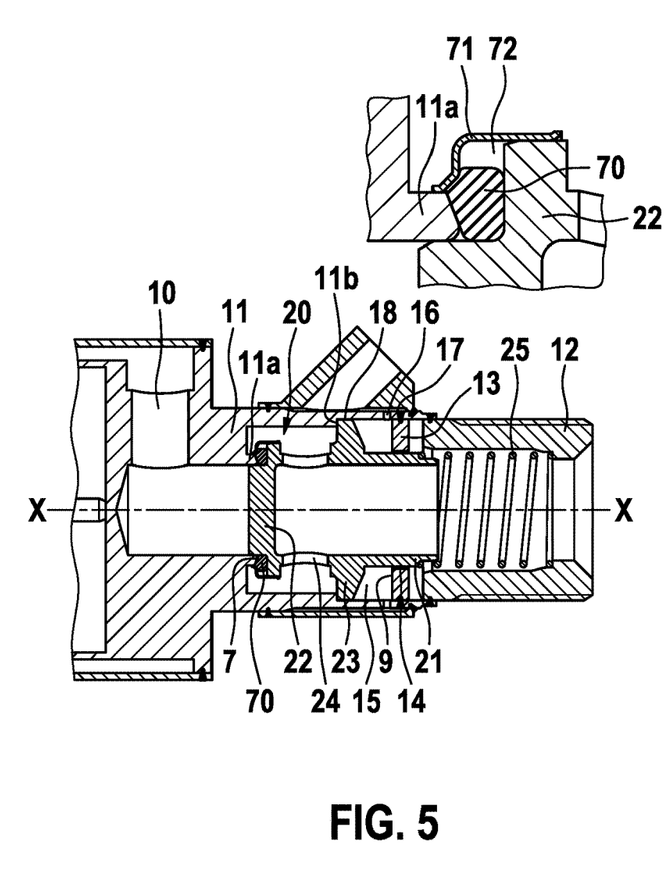
FIG. 5 is a schematic partial sectional view of a gas injector according to the second exemplary embodiment of the present invention in the closed state, with an additional detailed representation.

FIGS. 4 and 5 show a gas injector 1 according to a second exemplary embodiment of the present invention. Identical or functionally identical parts are denoted by the same reference signs as in the first exemplary embodiment.

In contrast to the first exemplary embodiment, the elastomeric sealing element 70 in the second exemplary embodiment is formed as an O-ring. FIG. 4 shows the open state of the second sealing seat 7 and FIG. 5 shows the closed state of the second sealing seat 7. From the additional enlargement shown in FIG. 4, it can be seen that the elastomeric sealing element 70 formed as an O-ring is held on the piston end face 22 by means of a retaining plate 71. As a result, a swelling space 72, in which an elastic deformation of the elastomeric sealing element 70 is possible, is produced. This is shown in the enlargement of FIG. 5. Thus, it is possible to use a standardized, cost-effective elastomeric sealing element in the form of an O-ring. Through the design with the retaining plate 71, increased axial tolerances are also possible. Thus, the elastomeric sealing element 70 can be provided particularly cost-effectively. The retaining plate 71 is preferably connected to the piston element 20 by means of a welded connection.

Figure 6:
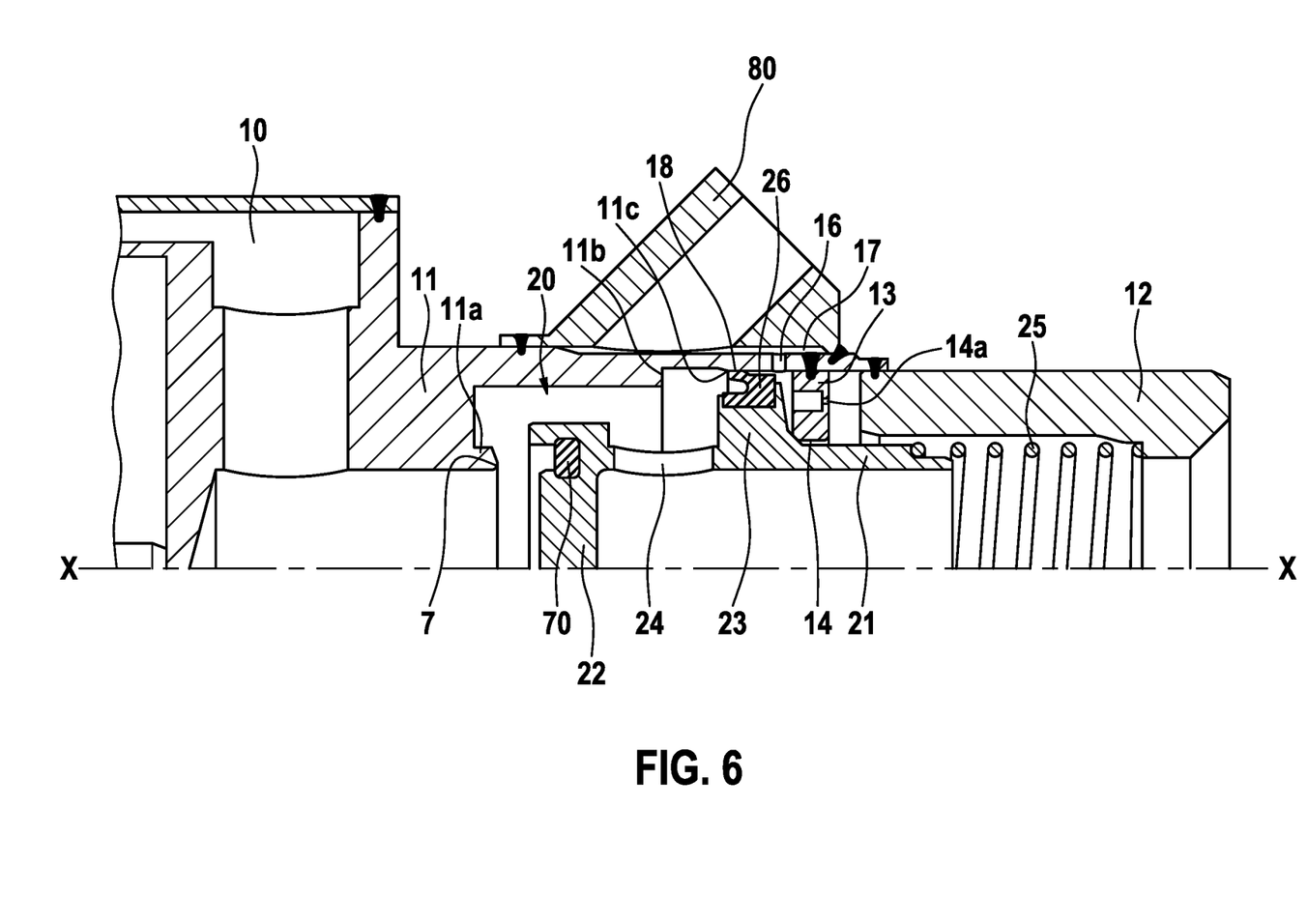
FIG. 6 is a schematic partial sectional view of a gas injector according to a third exemplary embodiment of the present invention in the open state.
Figure 7:
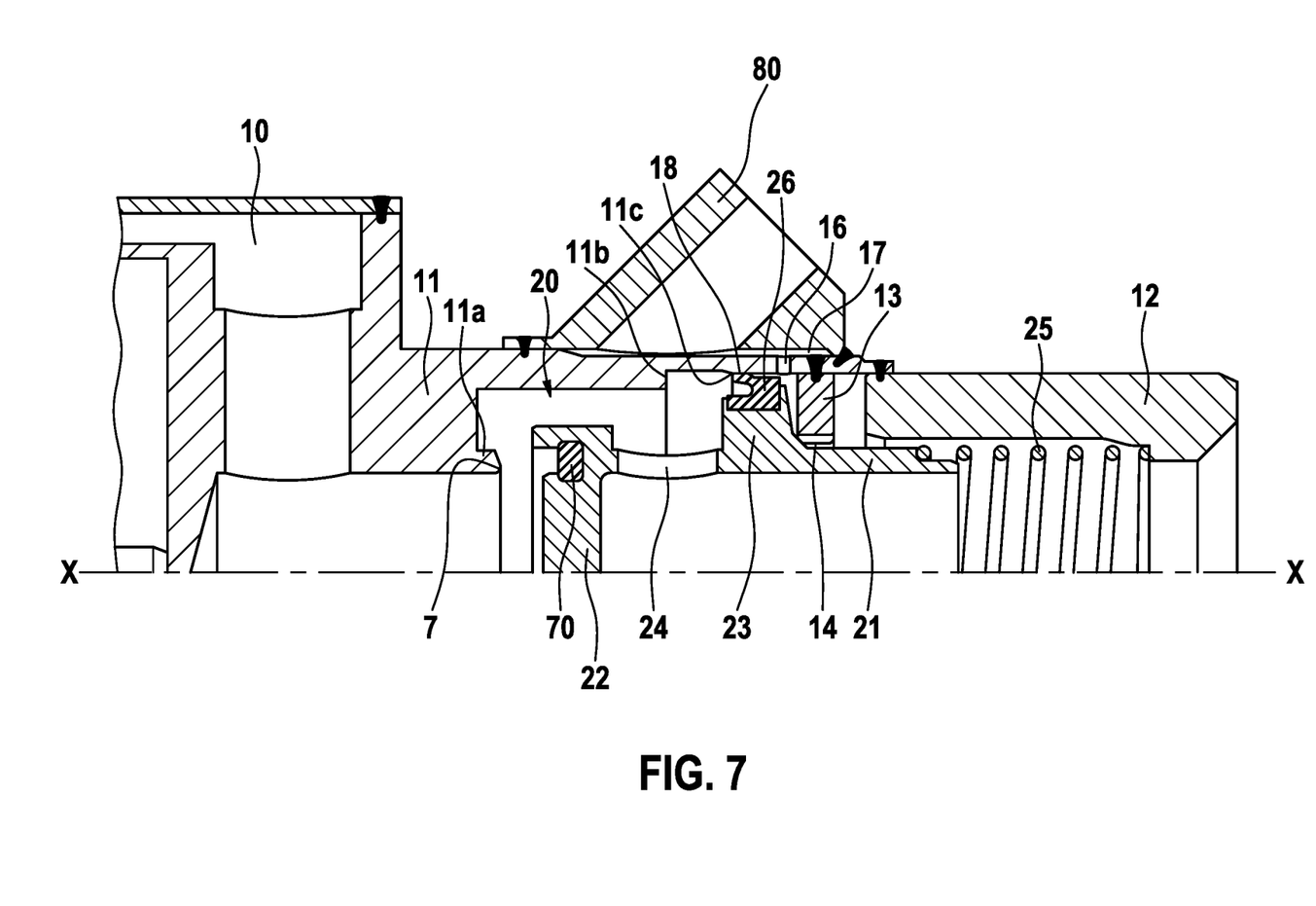
FIG. 7 is a schematic partial sectional view of a gas injector according to a fourth exemplary embodiment of the present invention in the open state.

FIGS. 6 and 7 show a gas injector 1 according to a third and fourth exemplary embodiment of the present invention. Identical or functionally identical parts are denoted by the same reference signs as in the above-described exemplary embodiments.

In contrast to the above-described exemplary embodiments, in the third and fourth exemplary embodiments a lip seal 26 is located on an outer circumferential region of the radially outwardly directed flange 23 of the piston element 20. The characteristics of the throttle gap 18 can be influenced by the lip seal 26. In particular, the lip seal 26 enables a smaller amount of leakage into the control chamber 15 when the second sealing seat 7 is open. For this purpose, a continuous diameter reduction 11c is provided on the housing component 11. In FIG. 6, a throttle 14a is additionally formed in the stop disk 13. In FIG. 7, the additional throttle is alternatively provided as a throttle gap 14. Otherwise, these exemplary embodiments correspond to the above-described exemplary embodiments, so that reference can be made to the description given there.

Figure 8:
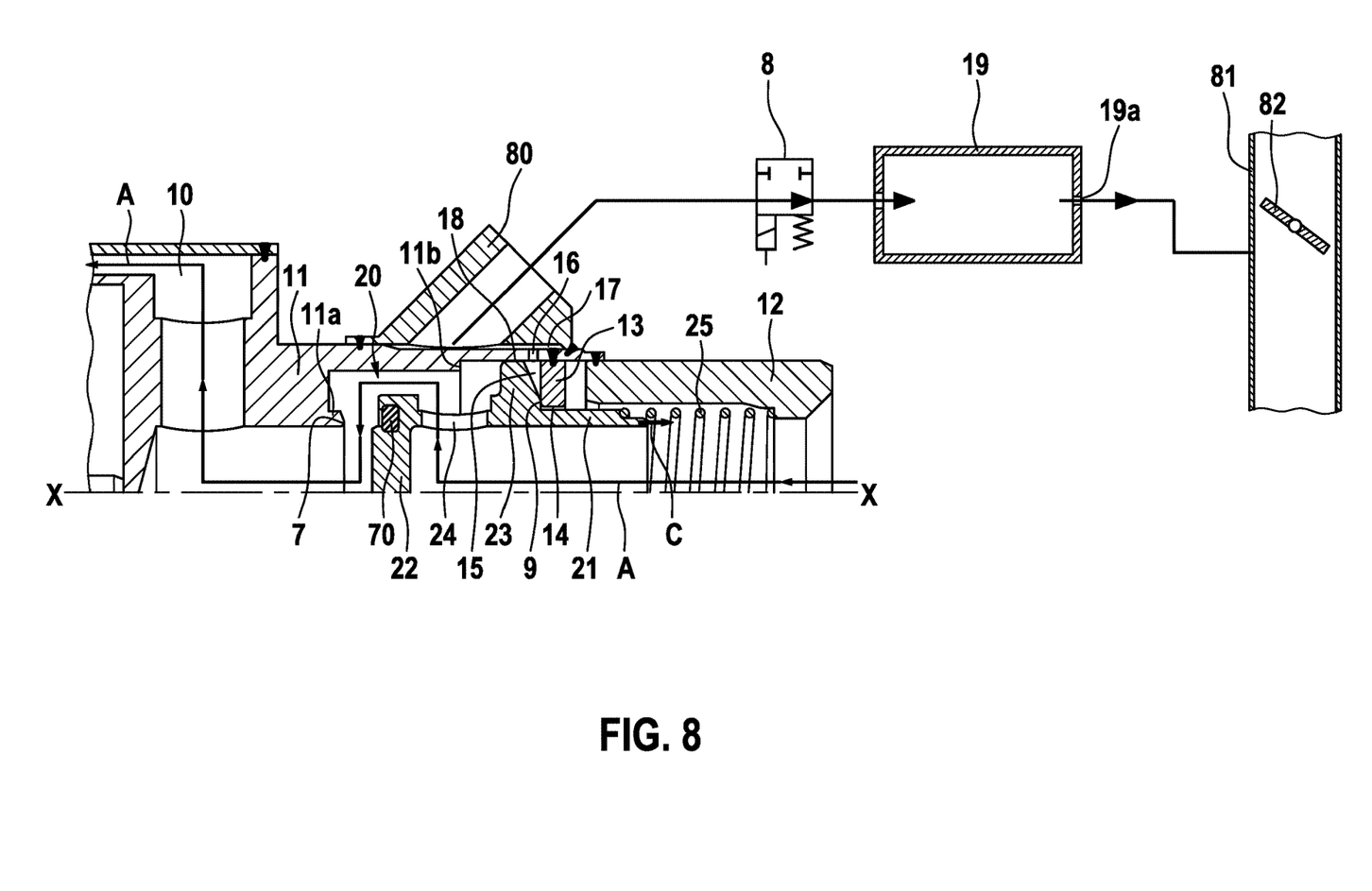
FIG. 8 is a schematic representation of a gas injector according to a fifth exemplary embodiment of the present invention.

FIG. 8 shows a gas injector 1 according to a fourth exemplary embodiment of the present invention. Identical or functionally identical parts are denoted by the same reference signs as in the above-described exemplary embodiments.

The fourth exemplary embodiment substantially corresponds to the first exemplary embodiment, wherein in addition to the first exemplary embodiment, a reservoir 19 is provided in the fourth exemplary embodiment. As can be seen from FIG. 8, the reservoir 19 is located between the control valve 8 and the vacuum source in the form of the intake pipe 81. At the outlet of the reservoir 19, a throttle 19*a* is located to provide an outflow of gaseous medium into the intake pipe 81 in a defined manner. As a result, a gaseous control quantity, which is located in the volume region from the control chamber 15 to the control valve 8, is discharged more slowly into the intake pipe 81. Thus, the amount of gaseous medium fed into the internal combustion engine via the intake pipe is distributed over a prolonged period of time. As a result, an ignitable mixture is prevented from forming in the intake pipe 81 in particular. Otherwise, this exemplary embodiment corresponds to the above-described exemplary embodiments, so that reference can be made to the above-described description.

The invention claimed is:

1. A gas injector for injecting a gaseous medium, comprising:
   a closing element which opens and closes a passage opening at a first sealing seat;
   an actuator configured to actuate the closing element;
   a restoring element configured to restore the closing element;
   a second sealing seat which is located between a gas supply line connection and the first sealing seat in a flow direction of the gaseous medium, and opens and closes a gas flow path in the gas injector;
   a vacuum connection which is located upstream of the second sealing seat in the flow direction of the gas injector; and
   a control valve which is fluidically connected to the vacuum connection and is configured to connect the vacuum connection to a vacuum source to open the second sealing seat.

2. The gas injector according to claim 1, wherein the second sealing seat is formed between an axially movable piston element and a housing component.

3. The gas injector according to claim 2, further comprising:
   a third sealing seat, which is located on the piston element and opens and closes a connecting path between the gas flow path in the gas injector and the control valve, wherein the piston element is movable back and forth between the second sealing seat and the third sealing seat.

4. The gas injector according to claim 3, wherein the third sealing seat is formed between a radially outwardly directed flange on the piston element and a stop disk on the housing component.

5. The gas injector according to claim 2, wherein the piston element is a hollow piston that has a piston end face against which the second sealing seat seals.

6. The gas injector according to claim 3, further comprising:
   a control chamber, which is formed on an outer circumference of the piston element and is located in the connecting path between the gas flow path in the gas injector and the control valve.

7. The gas injector according to claim 6, wherein a throttle is present between the control chamber and the gas flow path in the gas injector.

8. The gas injector according to claim 1, further comprising:
   a reservoir which is fluidically connected to the vacuum connection, wherein the control valve is arranged between the vacuum connection and the reservoir.

9. The gas injector according to claim 1, wherein the second sealing seat has an elastomeric sealing element.

10. An internal combustion engine, comprising:
    a gas injector for injecting a gaseous medium, including:
    a closing element which opens and closes a passage opening at a first sealing seat,
    an actuator configured to actuate the closing element,
    a restoring element configured to restore the closing element,
    a second sealing seat which is located between a gas supply line connection and the first sealing seat in a flow direction of the gaseous medium, and opens and closes a gas flow path in the gas injector,
    a vacuum connection which is located upstream of the second sealing seat in the flow direction of the gas injector, and
    a control valve which is fluidically connected to the vacuum connection and is configured to connect the vacuum connection to a vacuum source to open the second sealing seat.

11. The internal combustion engine according to claim 10, further comprising:
    an intake pipe as a vacuum source, wherein the control valve is located in a connecting line between the intake pipe and the vacuum connection.

* * * * *